United States Patent [19]

Edwards

[11] 4,267,745
[45] May 19, 1981

[54] SHIFT CONTROL FOR TRANSMISSION

[75] Inventor: Douglas F. Edwards, Mount Vernon, Ohio

[73] Assignee: The J. B. Foote Foundry Co., Fredericktown, Ohio

[21] Appl. No.: 87,829

[22] Filed: Oct. 25, 1979

[51] Int. Cl.³ .............................................. G05G 5/02
[52] U.S. Cl. ......................................... 74/476; 74/526
[58] Field of Search .................................. 74/476, 526

[56] References Cited

U.S. PATENT DOCUMENTS

| | | | |
|---|---|---|---|
| 1,250,355 | 12/1917 | Robinson et al. | 74/476 |
| 1,709,169 | 4/1929 | Froesch | 74/476 |
| 3,242,758 | 3/1966 | Harris et al. | 74/476 |
| 3,626,780 | 12/1971 | Lowder et al. | 74/526 X |
| 4,118,999 | 10/1978 | Bieber | 74/476 X |
| 4,137,792 | 2/1979 | Cellano | 74/476 X |

*Primary Examiner*—Allan D. Herrmann
*Attorney, Agent, or Firm*—Allen D. Gutchess, Jr.

[57] ABSTRACT

A shift control mechanism is provided for a transmission or the like. The control mechanism prevents the transmission from being shifted directly from a forward speed to reverse or vice versa. A shift lever of the transmission engages a slider when shifting between a reverse position and a neutral position or between a forward position and the neutral position. The slider is mounted in a guide on a lockout plate with the slider being limited in movement to prevent the shift lever from moving beyond the next adjacent position of the transmission in any single motion. Thus, the transmission must always be shifted into neutral when shifting between forward and reverse.

10 Claims, 6 Drawing Figures

U.S. Patent May 19, 1981 Sheet 1 of 2 4,267,745
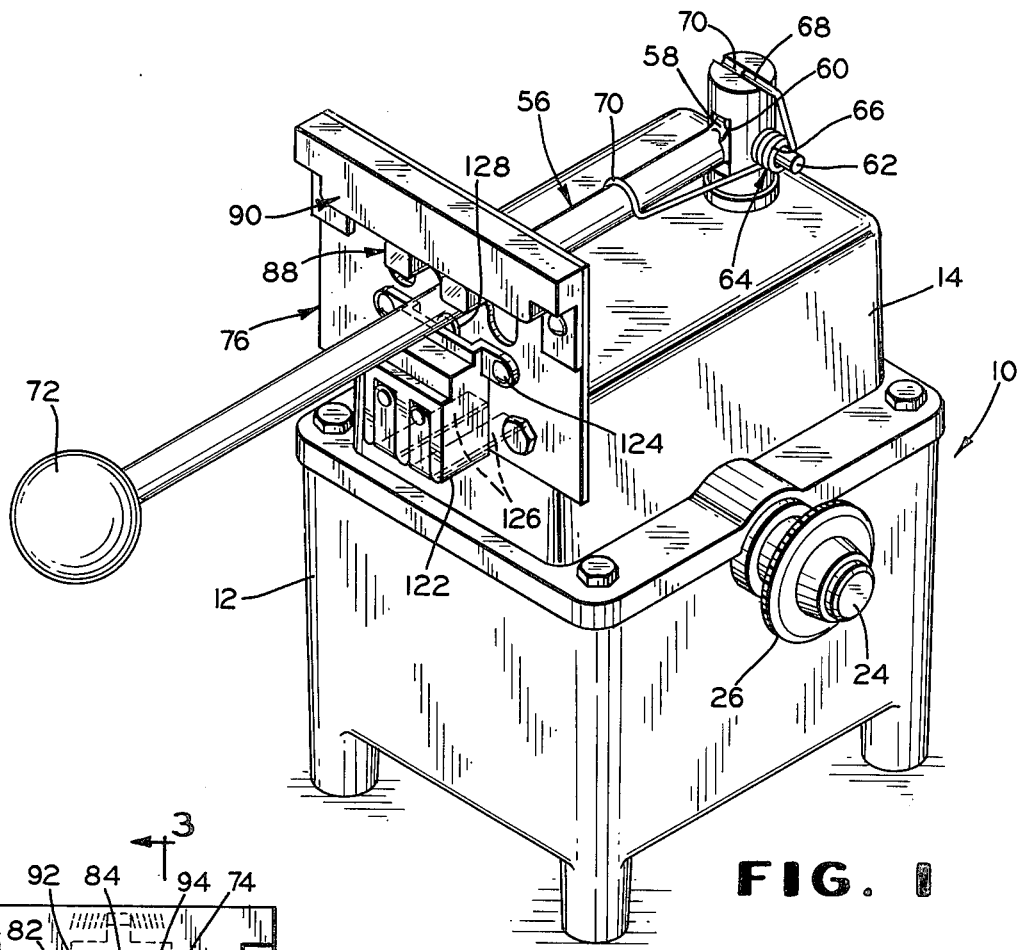
FIG. 1
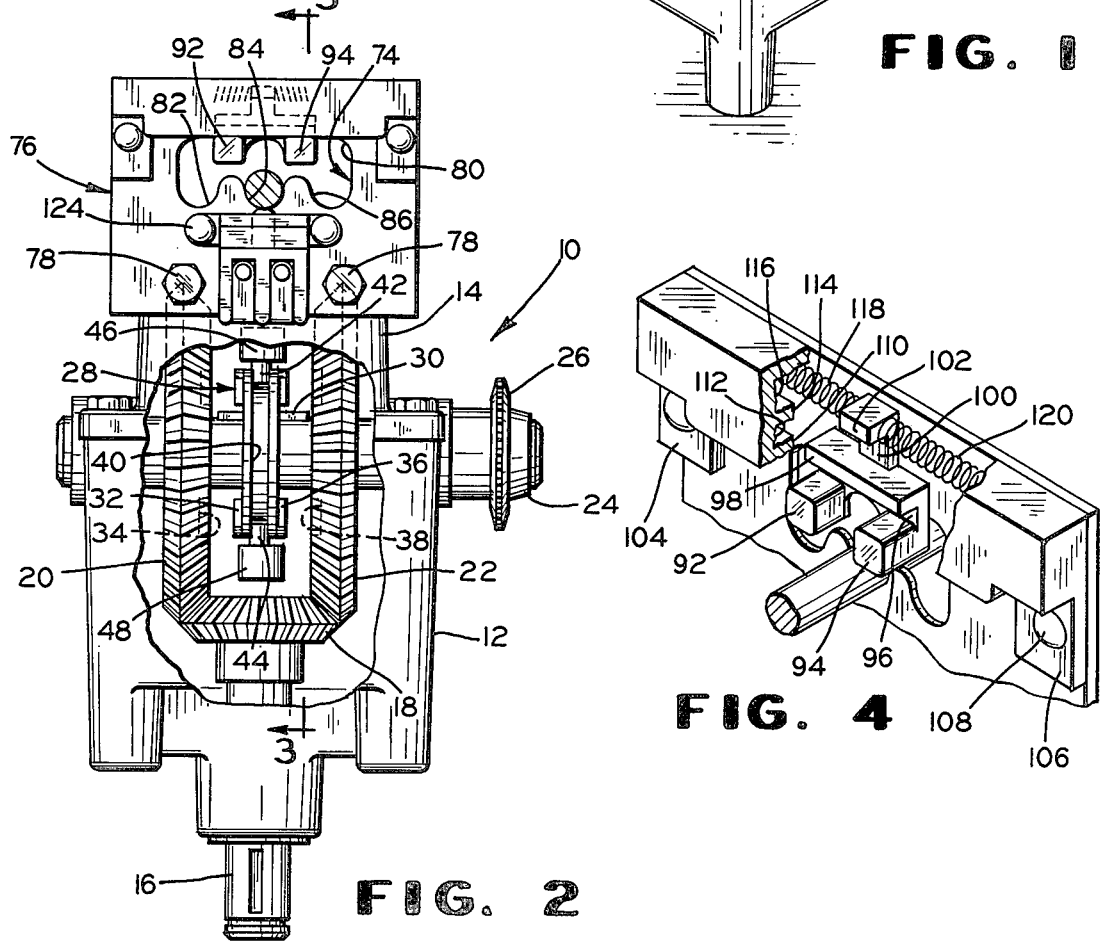
FIG. 2
FIG. 4

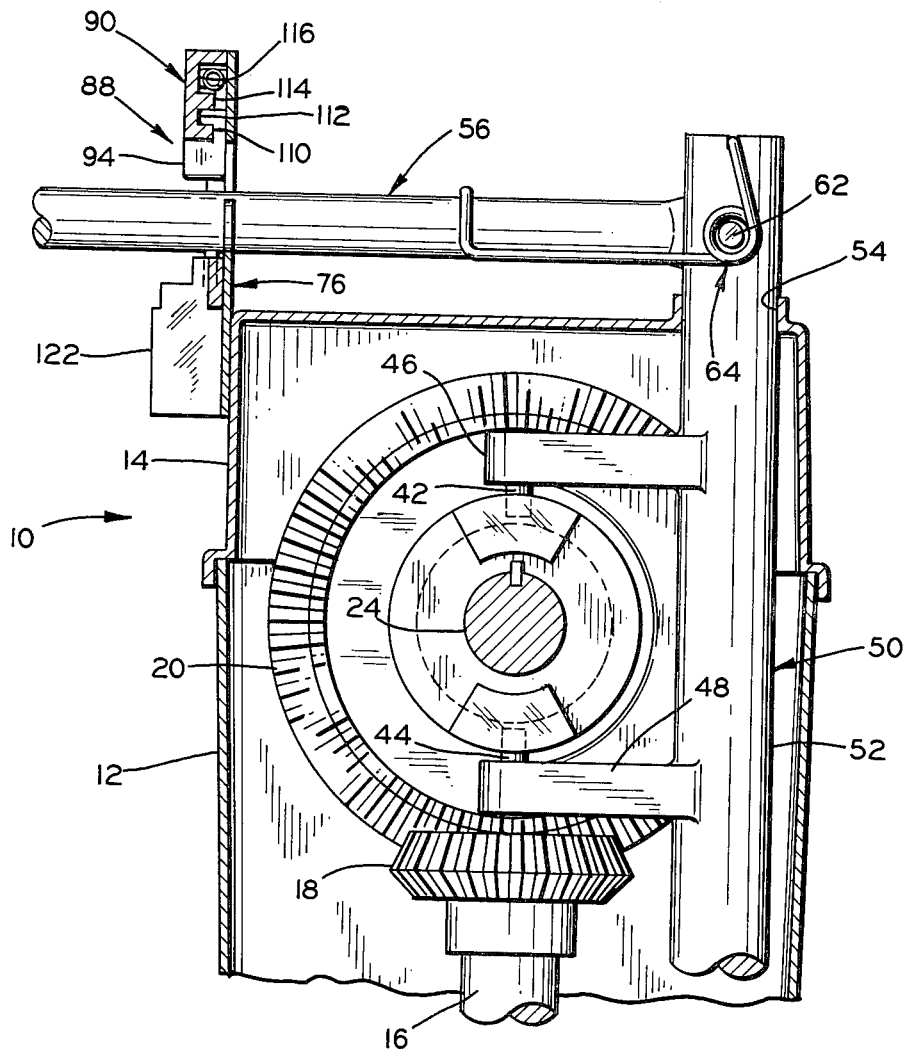
FIG. 3
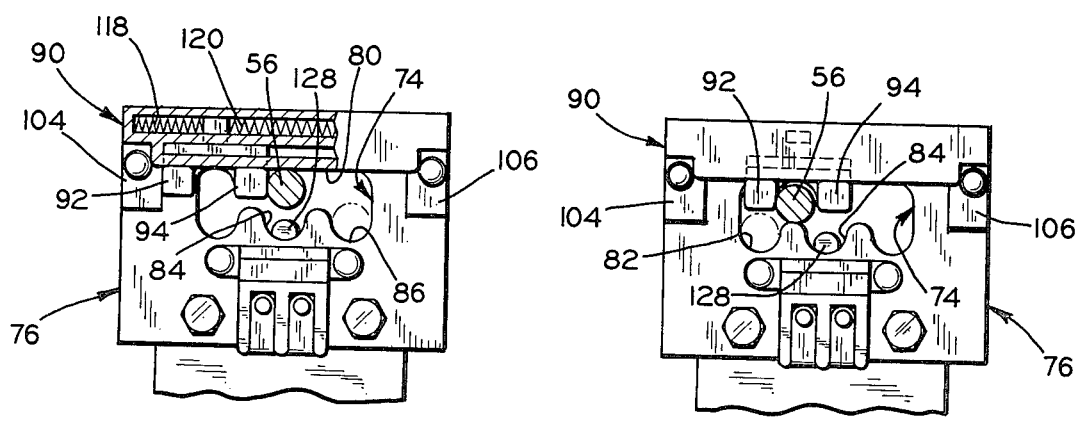
FIG. 5
FIG. 6

4,267,745

SHIFT CONTROL FOR TRANSMISSION

This invention relates to a shift control mechanism for a transmission to prevent the transmission from being shifted directly from forward to reverse to vice versa.

Small vehicles, such as lawn tractors or riding lawn mowers, frequently are provided with a small transmission having a reverse, neutral, and one or a few forward speeds. If the transmission is shifted by an operator directly from reverse to a forward speed or from a forward speed to reverse, damage can result to the components of the transmission or to other components of the drive train of the vehicle and the operator may also be injured by the sudden change in direction.

The present invention provides a shift control mechanism or lockout mechanism which prevents the shift lever of the transmission from being moved in a manner to shift the transmission directly between a forward speed and reverse. The shift control mechanism includes a lockout plate having an opening through which the shift lever of the transmission extends. The opening is contoured with three adjacent notches connected by a common slot at common ends of the notches. The three notches correspond to a reverse position, a neutral position, and a forward speed position of the transmission when the shift lever is in a particular notch. A slider has two projections aligned with the common slot, extending a distance sufficient that the shift lever cannot pass by either of them when moved along the slot without being moved down into one of the notches. The two projections are spaced apart a distance substantially equal to the width of the notches and are located on either side of the neutral notch when in a central position to which it is urged by springs on each side thereof. The slider is mounted in a guide and is limited in movement in either direction from the central position by a distance approximately equal to one of the notches. Hence, it is not possible to move the shift lever more than a distance to the next adjacent notch directly in one motion. Consequently, the transmission cannot be shifted directly from forward to reverse or vice versa.

It is, therefore, a principal object of the invention to provide a transmission which cannot be shifted directly between forward and reverse conditions.

Another object of the invention is to provide a shift control mechanism by means of which a shift lever of a transmission must be shifted into neutral before shifting into reverse from forward or into forward from reverse.

Many other objects and advantages of the invention will be apparent from the following detailed description of a preferred embodiment thereof, reference being made to the accompanying drawings, in which:

FIG. 1 is a somewhat schematic view in perspective of a transmission embodying shift control mechanism according to the invention;

FIG. 2 is a front view in elevation, with parts broken away, of the transmission and shift control mechanism of FIG. 1;

FIG. 3 is a fragmentary view taken along the line 3—3 of FIG. 2;

FIG. 4 is a fragmentary view in perspective, with parts broken away and with parts in section, of the shift control mechanism; and FIGS. 5 and 6 are schematic views in elevation of the shift control mechanism shown in two different positions.

Referring to the drawings and particularly to FIGS. 1-3, a transmission embodying the invention is indicated at 10 and includes a lower housing 12 to be mounted on a framework of a vehicle and an upper housing 14. An input shaft 16 extends downwardly below the housing 12 and can be equipped with a suitable pulley or sprocket by means of which it is driven from an engine of the vehicle. The input shaft 16 has a bevel gear 18 within the transmission which meshes with two driven bevel gears 20 and 22 which are rotatably mounted on an output shaft 24. The shaft 24 has a sprocket or pulley 26 by means of which an axle of the vehicle is driven.

The output shaft 24 is driven in one direction when the bevel gear 20 is connected to it and is driven in the opposite direction when the bevel gear 22 is connected to it. The direction depends upon the direction of rotation of the input shaft 16. It will be assumed in this disclosure that the bevel gear 20 drives the vehicle at a single forward speed and that the bevel gear 22 drives the vehicle at a single reverse speed.

A clutch dog or shift dog 28 is located between the gears 20 and 22 on the shaft 24 and is keyed thereto by a key 30 which enables slidable but non-rotatable movement of the clutch dog 28 on the shaft 24. The clutch dog 28 connects the bevel gear 20 to the shaft for rotation therewith when moved to the left with lugs 32 extending into recesses 34 in the gear 20. Similarly, the bevel gear 22 is connected to the shaft for rotation therewith when the clutch dog 28 is moved to the right with lugs 36 extending into recesses 38 in the gear 22.

The clutch dog 28 has a central annular groove 40 which receives pins 42 and 44 extending from arms 46 and 48 of a shifter fork 50. The shifter fork 50 has a vertical shaft 52 having a lower end rotatably supported in a recess in the bottom of the lower housing 12 and an upper end extending through an opening 54 in the upper housing 14. When the shaft 52 is turned about a vertical axis, it moves the clutch dog 28 between its three positions, one engaged with the bevel gear 20, a neutral position as shown in FIG. 2, and a third position engaged with the bevel gear 22. The shifter fork 50 is turned by a shift lever 56 having a flattened end 58 received in a recess 60 in the upper end of the shifter fork 50 and pivotally connected thereto by a pin 62 having an end extending well beyond the shaft 52. The shift lever 56 is urged downwardly by a spring 64 having an intermediate coil 66 received on the pin 62, having a bent upper end 68 received in a groove 70 of the shaft 52, and having a curved end 70 received over the shift lever 56. The outer end of the shift lever 56 has a suitable knob or handle 72.

An intermediate portion of the shift lever 56 extends through a generally E-shaped opening 74 in a lockout plate or member 76 which is mounted on the front of the upper housing 14 by machine screws 78 or the like. The opening 74 has a generally horizontal upper slot 80 communicating with upper ends of three notches 82, 84, and 86. When the shift lever 56 is in the first, outer notch 82, the shifter fork 50 is turned so that the clutch dog 28 engages the gear 20 to move the vehicle at the single forward speed. When the shift lever 56 is in the second, central notch 84, the shifter fork 50 holds the clutch dog 28 in the neutral position. When the shift lever 56 is in the third, outer notch 86, the shifter fork 50 is turned so that the dog 28 engages the bevel gear 22 to move the vehicle at the single reverse speed. With this arrangement, it would be possible for the operator to move the dog 28 directly from engagement with one of the gears 20 and 22 into engagement with the other of the gears 20 and 22. This could damage components of the transmission or other components of the drive train of the vehicle. It could also injure the operator by the sudden reverse change in direction of the vehicle.

To prevent such direct shifting, a slider 88 and a guide bar 90 are provided. The slider 88 has two projections 92 and 94 projecting into alignment with the slot 80 of the opening 74. The projections 92 and 94 are of sufficient size so that the shift lever 56 cannot be moved from one of the notches 82-86 to any other one of the notches through the slot 80 without engaging one of the projections. Also, the projections 92 and 92 are spaced apart about the width of one of the notches 82-86, with the width of the notches and the spacing of the projections being sufficient to receive the shift lever 56. The slider 88 has an arcuate notch 95 between the projections 92 and 94 which can receive the shift lever 56. Above the projections 92 and 94, the slider has a groove 96 and a ridge 98, with a shorter groove 100 and a shorter ridge 102 thereabove.

The guide 90 has fastening tabs 104 and 106 at the ends by means of which the guide is attached to the lockout plate 76 by rivets or other suitable fasteners 108. The tabs 106 also act as end stops for the slider 88 when contacted by the projections 92 and 94 (see FIG. 5). The guide 90 has a ridge 110 which extends between the tabs 104 and 106 and is received in the groove 96 of the slider 88. Above the ridge 110 is a groove 112 which also extends between the tabs and receives the ridge 98 of the slider 88. This cooperation of the ridges and grooves guides the slider 88 and prevents cocking of the projections 92 and 94. The guide 90 has a second ridge 114 above the groove 112 which extends into the short groove 100 of the slider and also has a longer and larger groove 116 above the ridge 114 which extends the full length of the guide 90 to positions beyond the inner edges of the tabs 104 and 106. The slider ridge 102 is in this groove.

Coil springs 118 and 120 are also located in the longer and larger groove 116 with outer ends abutting the ends of the groove 116 and inner ends abutting the short ridge 102 of the slider 88. The springs 118 and 120 urge the slider 88 toward the central, neutral position of FIG. 2 except when forced out of position by engagement of the shift lever 56 with one of the projections 92 and 94.

The operation of the lockout mechanism will be discussed particularly with reference to FIGS. 5 and 6. Assume that the shift lever 56 is in the reverse notch 86, as shown in dotted lines of FIG. 6. To shift the transmission, the operator then raises the shift lever 56, overcoming the force of the spring 64, and moves the lever into the elongate slot 80. He then moves the lever horizontally toward the next notch and in doing so contacts the projection 94, forcing the slider 88 toward the left and overcoming the force of the spring 118. This movement continues until the lever 56 reaches the solid line position in FIG. 5, over the neutral notch 84. At this point, the slider 88 and specifically the projection 92 contacts the tab 104 of the guide 90 and can move no farther. The operator then must move the lever 56 down into the notch 84, at which time the springs 118 and 120 move the slider 88 back into the neutral position, as shown in FIG. 2.

To shift the transmission to the forward speed, the operator must then raise the lever 56 a second time, moving it into the arcuate notch 95 of the slider. The operator then moves the lever 56 horizontally towards the first speed notch 82. At this time the lever engages the projection 92 and moves the slider 88 again to the left. The lever is over the notch 82 by the time the slider 88 reaches its end position and the operator can then move the lever 56 down into the forward speed notch 82, as shown in dotted lines in FIG. 6.

If the operator wishes to shift the transmission from forward to reverse, the slider acts in the same manner in the opposite direction. Hence, it will be seen that in any case, the lever 56 must be moved into the neutral position when shifting from reverse to forward or from forward to reverse.

A neutral start switch 122 can also be mounted on the lockout plate 76 by rivets 124. The switch 122 has lower terminals 126 to which conductors of an electric starting system of the vehicle can be connected. The switch also has a tab 128 extending into the neutral notch 84 of the plate 76, as shown in FIGS. 5 and 6. When the shift lever 56 is in the neutral notch 84, it depresses the tab 128 and operates the switch in a manner to enable the starting system to function so that the engine can be started. In any other position of the lever 56, the tab 128 is up and the engine cannot be started.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In a transmission having an output shaft, a first gear rotatably mounted on said shaft, a second gear rotatably mounted on said shaft, a shift dog mounted on said shaft for rotation therewith and for slidable movement with respect thereto, said shift dog having a first position engageable with said first gear, a second position engageable with said second gear, and a third, neutral position therebetween in which said shift dog is disengaged from both gears, a shifter fork engaged with said shift dog for moving said shift dog among its three positions, said shifter fork having a shaft extending away from said shift dog, a shift lever connected to said shaft and movable among three positions to correspondingly move said shift dog among its three positions by said shifter fork, a lockout plate having an opening including an elongate slot with three notches along one side corresponding to the three positions of said shift lever, with a central one of the three notches corresponding to the neutral position of said shift dog and the outer notches corresponding to the two engaged positions of said shift dog, said shift lever extending through said opening, a guide located adjacent said elongate slot, a lockout slider having a portion guided in said guide for movement parallel to said slot and having two projections in alignment with said elongate slot, said projections being spaced apart a distance approximately equal to the width of the central notch, said guide having stops engageable with said slider to limit movement of said slider so that said projections can be moved in each direction along said slot a distance only about equal to the width of one of the notches, whereby said shift lever can only be moved from one notch to an adjacent notch at a time and cannot be moved between the outer two notches without first being moved into the central notch.

2. A transmission according to claim 1 characterized by said slider being resiliently mounted to return said projections to positions on each side of said central notch when pushed out of that position by said shift lever and after shift lever is moved into one of said notches.

3. A transmission according to claim 1 characterized by resilient means urging said shift lever toward said notches from said elongate slot.

4. A transmission according to claim 3 characterized by a switch mounted on said lockout plate and having a tab extending into said central notch, said tab being depressed to operate said switch when said shift lever is in said central notch.

5. In a transmission having forward, neutral, and reverse, a shift lever having three positions effective to place the transmission in any of its three conditions, a lockout member having an elongate slot with a central notch and two outer notches along one side thereof corresponding to the three positions of the shift lever, with the central notch corresponding to the neutral condition of the transmission, a guide located adjacent said elongate slot, a lockout slider having a portion guided in said guide for movement of said slider parallel to said slot, said slider having two projections aligned with said slot and projecting a distance sufficient to prevent said shift lever from moving past said projections when moved along said slot, said projections being spaced on each side of the central notch when in an intermediate position, said slider being movable only a distance sufficient that each of said projections can be moved along the elongate slot only about a distance equal to the width of the central notch, whereby said shift lever cannot be moved between the outer two notches without first being moved into said central notch.

6. A transmission according to claim 5 characterized by resilient means for urging said slider to the intermediate position with said projections on each side of said central notch.

7. A transmission according to claim 6 characterized by said resilient means comprising two coiled springs carried by said guide on each side of said slider portion.

8. A transmission according to claim 5 characterized by resilient means urging said shift lever toward said notches from said elongate slot.

9. A transmission according to claim 8 characterized by a switch mounted on said lockout member and having a tab extending into said central notch, said tab being depressed by said shift lever when in said central notch to operate said switch.

10. A transmission according to claim 5 characterized by said guide having spaced stops which engage said projections to limit the movement of said projections along said slot.

* * * * *